US012041691B2

(12) United States Patent
Landais et al.

(10) Patent No.: US 12,041,691 B2
(45) Date of Patent: Jul. 16, 2024

(54) NON-3GPP INTERWORKING FUNCTION SELECTION FOR PUBLIC NETWORK INTEGRATED NON-PUBLIC NETWORKS

(71) Applicant: NOKIA TECHNOLOGIES OY, Espoo (FI)

(72) Inventors: Bruno Landais, Pleumeur-bodou (FR); Devaki Chandramouli, Plano, TX (US); Gyorgy Wolfner, Budapest (HU); Markus Isomäki, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 355 days.

(21) Appl. No.: 17/641,151

(22) PCT Filed: Sep. 10, 2019

(86) PCT No.: PCT/US2019/050366
§ 371 (c)(1),
(2) Date: Mar. 8, 2022

(87) PCT Pub. No.: WO2021/050048
PCT Pub. Date: Mar. 18, 2021

(65) Prior Publication Data
US 2022/0337993 A1    Oct. 20, 2022

(51) Int. Cl.
*H04W 8/18*   (2009.01)
*H04W 24/02*  (2009.01)
*H04W 48/14*  (2009.01)
(52) U.S. Cl.
CPC .......... *H04W 8/186* (2013.01); *H04W 24/02* (2013.01); *H04W 48/14* (2013.01)

(58) Field of Classification Search
None
See application file for complete search history.

(56) References Cited

U.S. PATENT DOCUMENTS

| | | | |
|---|---|---|---|
| 10,966,269 B2 * | 3/2021 | Keller | H04L 65/4015 |
| 11,129,212 B2 * | 9/2021 | Benson | H04M 15/66 |
| 2011/0034246 A1 | 2/2011 | Amitzur | |

FOREIGN PATENT DOCUMENTS

| | | |
|---|---|---|
| KR | 2011/0004868 A | 1/2011 |
| WO | WO 2017/032280 A1 | 3/2017 |
| WO | WO 2018/145727 A1 | 8/2018 |

OTHER PUBLICATIONS

"3rd Generation Partnership Project; Technical Specification Group Core Network and Terminals; User Equipment (UE) policies for 5G System (5GS); Stage 3 (Release 16)", 3GPP TS 24.526 v16.0.0, (Jun. 2019), 41 pages.

(Continued)

*Primary Examiner* — Hong S Cho
(74) *Attorney, Agent, or Firm* — Robert P. Michal, Esq.; Carter, DeLuca & Farrell LLP

(57) ABSTRACT

A plurality of interworking functions, which provide interworking between a communication network acting as access network and another communication network, is associated with a plurality of network slices or non-public networks hosted by the other communication network. A user equipment performs connection (S301) to a communication network acting as access network, and selects (S303) an interworking function of the plurality of interworking functions based on information on a network slice or non-public network hosted by the other communication network, wherein the user equipment is associated with the network slice or non-public network.

8 Claims, 3 Drawing Sheets

(56) References Cited

OTHER PUBLICATIONS

"3rd Generation Partnership Project; Technical Specification Group Services and System Aspects; Architecture enhancements for non-3GPP accesses (Release 16)", 3GPP TS 23.402 v16.0.0, (Jun. 2019), 314 pages.

"3rd Generation Partnership Project; Technical Specification Group Services and System Aspects; System Architecture for the 5G System; Stage 2 (Release 16)", 3GPP TS 23.501 v16.1.0, (Jun. 2019).

International Search Report and Written Opinion for Patent Cooperation Treaty Application No. PCT/US2019/050366 dated Dec. 10, 2019, 8 pages.

\* cited by examiner

NON-3GPP INTERWORKING FUNCTION SELECTION FOR PUBLIC NETWORK INTEGRATED NON-PUBLIC NETWORKS

CROSS-REFERENCE TO RELATED APPLICATIONS

This application is a national phase entry of International Application No. PCT/US2019/050366, filed Sep. 10, 2019, the entire contents of which are incorporated herein by reference.

TECHNICAL FIELD

At least some example embodiments relate to non-3GPP interworking function selection for public network integrated non-public networks.

LIST OF ABBREVIATIONS

3GPP 3rd Generation Partnership Project
5G 5th generation cellular telephony system
5G-AN 5G Access Network
5GC 5G CN
5GS 5G System
AMF Access and Mobility management Function
AS Access Stratum
CAG Closed Access Group
CN Core Network
DNS Domain Name Server
ePDG evolved Packet Data Gateway
EPS Evolved Packet System
FQDN Fully Qualified Domain Name
N3IWF Non-3GPP InterWorking Function
NAS Non-Access Stratum
NG Next Generation
NPN Non-Public Network
NSSAI Network Slice Selection Assistance Information
PCF Policy Control Function
PDN Packet Date Network
PLMN Public Land Mobile Network
RAN Radio Access Network
SA Security Association
SD Slice Differentiator
S-NSSAI Single NSSAI
SST Slice/Service Type
UE User Equipment

BACKGROUND

3GPP is specifying in Release 16 system enhancements required for 5G system to support new vertical service requirements, including in particular the support of Non-Public Network (NPN).

NPNs may be of the following types:
Public network integrated NPN: A non-public network deployed with the support of a PLMN.
Stand-alone Non-Public Network: A non-public network not relying on network functions provided by a PLMN.

Public network integrated NPNs are enabled by using Closed Access Group (CAG) and this enables cell reselection based on CAG ID and access control using CAG. To prevent unauthorized UEs from trying to access a Public network integrated NPN, CAG functionality can be used. Public network integrated NPNs can also be enabled using network slicing.

A PLMN can support a large number of NPNs (e.g. enterprise private networks, campus) and, thus, network slices, in different locations, and with different requirements on the supported features.

Network slicing allows differentiation of the supported features and network functions optimizations per service type, customer or NPN, and network isolation.

Further, a UE can perform N3IWF selection based on a set of information configured by a HPLMN in the UE, and based on the UE's knowledge of a PLMN it is attached to. A UE connected to one or multiple UPFs can use a single N3IWF.

SUMMARY

At least some example embodiments aim at utilizing information on a non-public network for N3IWF selection.

According to at least some example embodiments, this is achieved by the methods, apparatuses and non-transitory computer-readable storage media specified by the appended claims.

At least some example embodiments enable an option for PLMN operators to deploy and select a network slice or integrated NPN specific N3IWF when:
UE accesses the PLMN via NPN with 3GPP access;
UE accesses the PLMN via non-3GPP access;
UE accesses the PLMN via another PLMN with 3GPP access.

In the following example embodiments and example implementations will be described with reference to the accompanying drawings.

DESCRIPTION OF THE EMBODIMENTS

A UE selects an N3IWF when registering to a 5GC of a PLMN via an NPN with 3GPP access network, via a non-3GPP access network, or via another PLMN with 3GPP access network.

Figure 1:
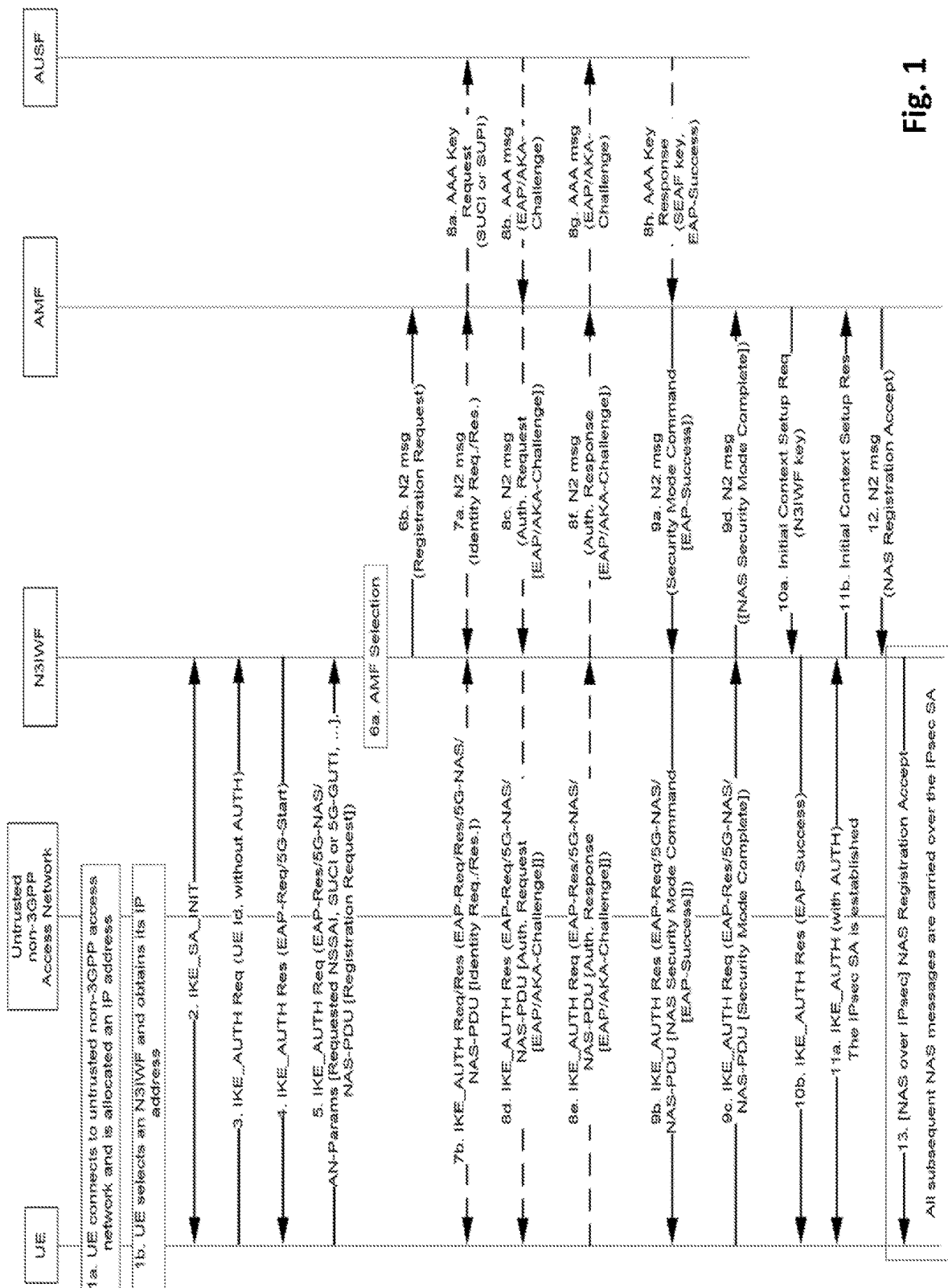
FIG. 1 shows a signaling diagram illustrating a registration procedure for an untrusted non-3GPP access.

FIG. 1 shows a signaling diagram illustrating a registration procedure for an untrusted non-3GPP access.

In step 1a, the UE connects to an untrusted non-3GPP access network and it is assigned an IP address. Any non-3GPP authentication method can be used, e.g. no authentication (in case of a free WLAN), EAP with pre-shared key, username/password, etc.

When the UE decides to attach to 5GC network, in step 1b, the UE selects an N3IWF in a 5G PLMN.

For selection of the N3IWF, the UE may be configured in particular with:
an N3IWF identifier configuration, containing an FQDN or IP address of the N3IWF in a HPLMN of the UE; and information indicating, per serving PLMN, whether the UE should select the N3IWF based on an Operator Identifier or based on a 5GS or EPS Tracking Area Identity.

According to at least some example embodiments, the above-described information for selection of N3IWF is extended, and the UE is configured to select the N3IWF in the 5G PLMN based on a network slice or based on CAG ID broadcast by CAG cells in which the UE is camping, which will be described in more detail later on.

In step 2, the UE proceeds with the establishment of an IPsec Security Association (SA) with the selected N3IWF.

In steps 3 to 5, authentication is performed between the UE and the N3IWF.

In step 6a, the N3IWF selects an AMF based on information received in the authentication in step 5 and local policy. In step 6b, the N3IWF forwards a registration request to the selected AMF.

In steps 7a to 11b, signaling IPsec SA is established and authentication is performed between the AMF, an AUSF and the UE.

In step 12, the AMF sends an NAS Registration Accept message to the N3IWF. The N2 Message includes an Allowed NSSAI for the access type for the UE.

Finally, in step 13, the N3IWF forwards the NAS Registration Accept to UE via the established signaling IPsec SA.

Figure 2:
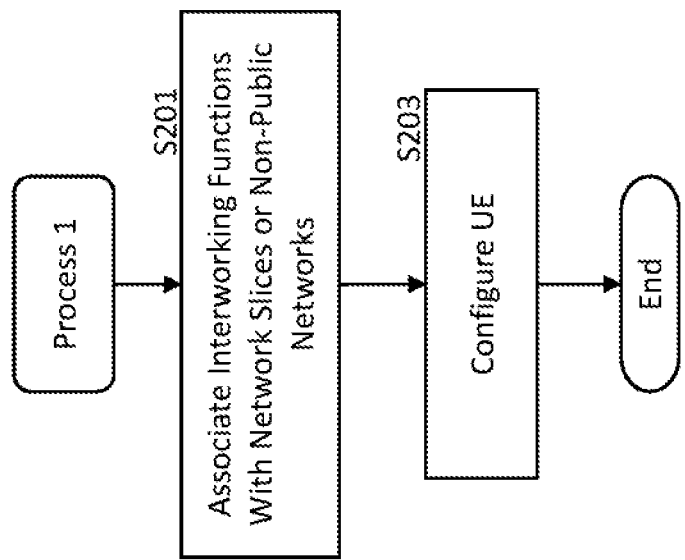
FIG. 2 shows a flowchart illustrating a process for a network operator side according to at least some example embodiments.

Now reference is made to FIG. 2 illustrating a process 1 according to at least some example embodiments. According to an example implementation, process 1 is executed using a network entity, e.g. a PCF.

In step S201, a plurality of interworking functions (e.g. N3IWFs), which provide interworking between a communication network acting as an access network (e.g. 3GPP access network, untrusted non-3GPP access network) and another communication network (e.g. PLMN), is associated with a plurality of network slices or non-public networks (NPNs) hosted by the other communication network. Then process 1 proceeds to step S203.

In step S203, a UE is configured to select an interworking function of the plurality of interworking functions based on information on a network slice or non-public network the UE is associated with, of the plurality of network slices or non-public networks. Then process 1 ends.

Figure 3:
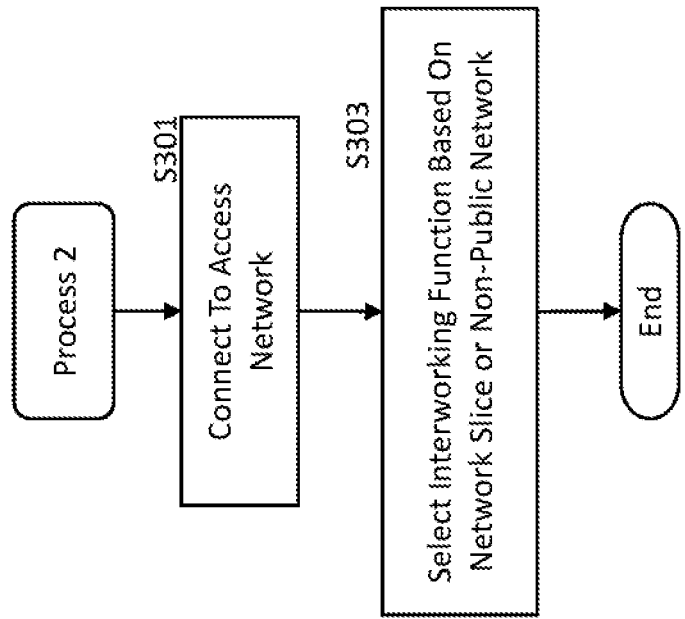
FIG. 3 shows a flowchart illustrating a process for a user equipment side according to at least some example embodiments.

FIG. 3 illustrates a process 2 according to at least some example embodiments. According to an example implementation, process 2 is executed by a UE.

In step S301, connection to a communication network acting as an access network is performed. Then process 2 proceeds to step S303. According to an example implementation, step S301 corresponds to step 1a of FIG. 1.

In step S303, an interworking function, which provides interworking between the communication network acting as the access network and another communication network, is selected based on information on a network slice or non-public network hosted by the other communication network, wherein the UE is associated with the network slice or non-public network. Then process 2 ends.

According to an example embodiment, the non-public network comprises a network slice of the communication network. The information on the NPN comprises an identity of the network slice the UE is accessing.

It is noted that a network slice is a logical network that provides specific network capabilities and network characteristics. For example, the network slice comprises Core Network Control Plane and User Plane Network Functions, and, in the 5G PLMN, the N3IWF functions.

According to an example implementation, the above-described other communication network comprises a public land mobile network (PLMN).

According to another example implementation, the above-described communication network acting as the access network comprises a public land mobile network (PLMN).

According to another example implementation, the above-described communication network acting as the access network comprises a Non-Public Network.

According to an example implementation, the communication network acting as the access network comprises the same network as the other communication network.

In this example embodiment, communication network (e.g. PLMN) subscription includes support for Subscribed S-NSSAI to be used for the NPN. The UE is also configured with the Configured NSSAI for the serving PLMN.

According to an example embodiment, the non-public network (NPN) comprises a closed access group (CAG). The information on the NPN comprises an identifier of the CAG broadcast by CAG cells that the UE is allowed to access.

According to at least some example embodiments, as mentioned above, the information for selection of N3IWF is extended to introduce an alternative option for an UE to select an N3IWF based on a network slice the UE is accessing or based on CAG Identifiers broadcast by CAG cells (in 3GPP access) that the UE is allowed to access.

For example, this extension is defined by defining a new value of the FQDN format field of N3AN node selection information.

When configured with this new option, the UE selects the N3IWF based on the network slice the UE is accessing or based on the CAG Identifiers broadcast by CAG cells that the UE is allowed to access.

According to an example implementation, the UE stores the last used CAG identifier(s) and can use this information for N3IWF selection when it is not attached to any PLMNs.

The UE selects the N3IWF by querying a Domain Name Server (DNS) using an N3IWF FQDN whose format includes the identity of the network slice or CAG. For example, the identity of the network slice can be based on just SST, or based on SST and SD. The N3IWF FQDN can be constructed using either of these options.

In order to identify a Network Slice end to end, 5GS uses information called S-NSSAI (Single Network Slice Selection Assistance Information). An S-NSSAI comprises a Slice/Service type (SST), and a Slice Differentiator (SD), which is optional information that complements the Slice/Service type(s) to differentiate amongst multiple Network Slices.

Figure 4:
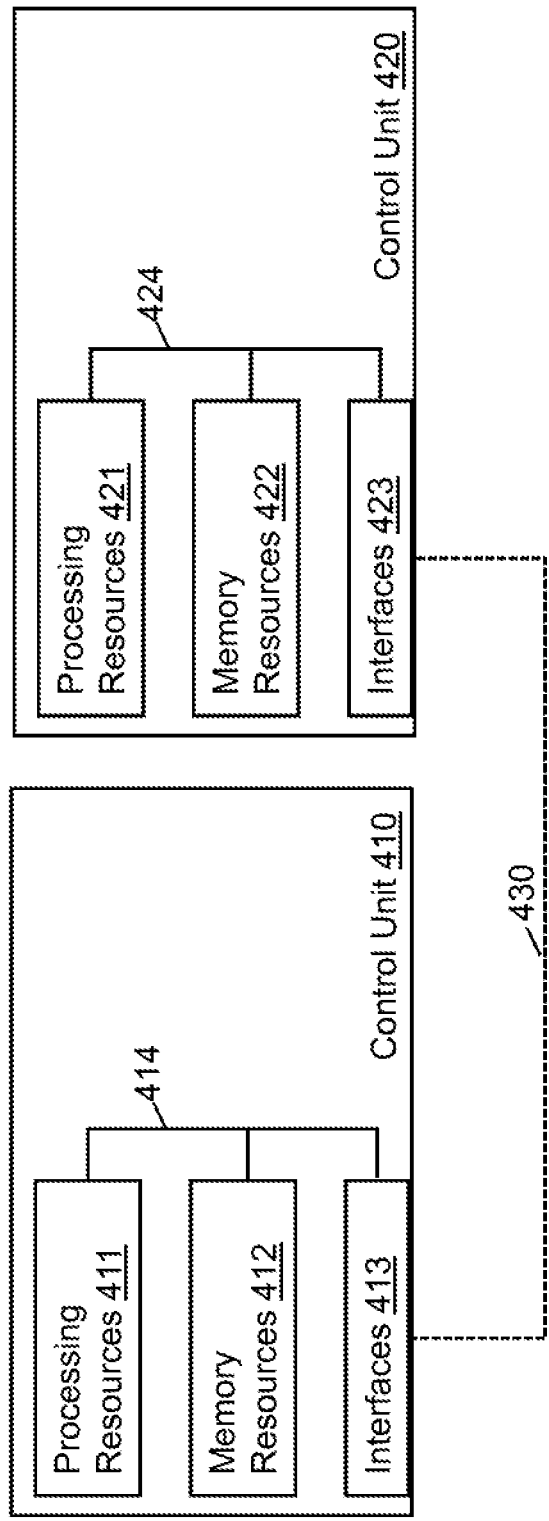
FIG. 4 shows a schematic block diagram illustrating a configuration of control units in which example embodiments are implementable.

In case the format of the N3IWF FQDN includes the identity of the network slice "S-NSSAI", and the S-NSSAI includes both SST (Slice/Service Type) and Slice Differentiator (SD) fields, the UE queries the DNS with an FQDN formatted e.g. as follows:
sd<slice_differentiator>.sst<slice/
service_type>.snssai.n3iwf.5gc.mnc<MNC>.
mcc<MCC>.pub.3gppnetwork.org Adopting an example with SST value 130, SD value 9, MCC 345 and MNC 12, the UE queries the DNS with the following FQDN:
sd9.sst130.snssai.n3iwf.5gc.mnc012.mcc345.pub.
3gppnetwork.org In case the format of the N3IWF FQDN includes the identity of the network slice "S-NSSAI", and the S-NSSAI includes just an SST field, for selecting the N3IWF, the UE queries the DNS with an FQDN formatted e.g. as follows:
sst<slice/service_type>.snssai.n3iwf.5gc.
  mnc<MNC>.mcc<MCC>.pub.3gppnetwork.org Adopting an example with SST value 130, MCC 345 and MNC 12, the UE queries the DNS with the following FQDN:
sst130.snssai.n3iwf.5gc.mnc012.mcc345.pub.3gppnetwork.org In case the format of the N3IWF FQDN includes the identity of the CAG, for selecting the N3IWF, the UE queries the DNS with an FQDN formatted e.g. as follows:
cid<CAG_Identifier>.cag.n3iwf.5gc.mnc<MNC>.
  mcc<MCC>.pub.3gppnetwork.org Adopting an example with CAG Identifier value 28, MCC 345 and MNC 12, the UE queries the DNS with the following FQDN:
cid28.cag.n3iwf.5gc.mnc012.mcc345.pub.3gppnetwork.org FIG. 4 shows a schematic block diagram illustrating a configuration of control units 410 and 420 in which example embodiments are implementable.

The control unit 410 comprises processing resources (e.g. processing circuitry) 411, memory resources (e.g. memory circuitry) 412 and interfaces (e.g. interface circuitry) 413, connected via a link 414. For example, the memory resources 412 store a program.

According to an example implementation, the control unit 410 is part of and/or used by a network entity. For example, the control unit 410 is configured to realize process 1 shown in FIG. 2.

According to an example implementation, the control unit 410 is coupled to a control unit 420 via a connection 430.

The control unit 420 comprises processing resources (e.g. processing circuitry) 421, memory resources (e.g. memory circuitry) 422 and interfaces (e.g. interface circuitry) 423, connected via a link 424. For example, the memory resources 422 store a program.

According to an example implementation, the control unit 420 is part of and/or used by a UE. For example, the control unit 420 is configured to realize process 2 shown in FIG. 3.

Further, as used in this application, the term "circuitry" refers to one or more or all of the following:
  (a) hardware-only circuit implementations (such as implementations in only analog and/or digital circuitry) and
  (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
  (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, the example embodiments may be implemented by computer software stored in the memory resources 412, 422 and executable by the processing resources 411, 421, or by hardware, or by a combination of software and/or firmware and hardware.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

According to an aspect, an apparatus is provided, which comprises means for associating a plurality of interworking functions, which provide interworking between a communication network acting as an access network and another communication network, with a plurality of network slices or non-public networks hosted by the other communication network, and means for configuring a user equipment to select an interworking function of the plurality of interworking functions based on information on a network slice or non-public network the user equipment is associated with, of the plurality of network slices or non-public networks.

According to an example implementation, the apparatus executes process 1 shown in FIG. 2. According to an alternative example implementation or in addition, the apparatus comprises and/or uses the control unit 410 shown in FIG. 4.

According to an aspect, an apparatus for use by a user equipment is provided. The apparatus comprises means for performing connection to a communication network acting as an access network, and means for selecting an interworking function which provides interworking between the communication network acting as the access network and another communication network, based on information on a network slice or non-public network hosted by the other communication network, wherein the user equipment is associated with the network slice or non-public network.

According to an example implementation, the apparatus executes process 2 shown in FIG. 3. According to an alternative example implementation or in addition, the apparatus comprises and/or uses the control unit 420 shown in FIG. 4.

According to an example embodiment, the apparatus comprises means for, for selecting the interworking function, including the information on the network slice or non-public network into a query for an internet protocol address of the interworking function.

According to an example embodiment, the non-public network comprises at least one of a network slice of the communication network and a closed access group.

According to an example embodiment, the information on the non-public network comprises at least one of an identity of the network slice the user equipment is accessing and an identifier of the closed access group broadcast by closed access group cells that the user equipment is allowed to access.

According to an example embodiment, the identity of the network slice is based on a type and/or service of the network slice.

According to an example embodiment, the identity of the network slice is based on the type and/or service of the network slice and a differentiator of the network slice.

According to an example embodiment, the identifier of the closed access group is a last used identifier that was stored by the user equipment.

According to an example embodiment, the interworking function comprises a non-third generation partnership project interworking function.

According to an example embodiment, the access network comprises at least one of a non-third generation partnership project access network and a third generation partnership project access network.

According to an example embodiment, the other communication network comprises a public land mobile network (PLMN).

According to an example embodiment, the communication network acting as the access network comprises a PLMN.

According to an example embodiment, the communication network acting as the access network comprises a Non-Public Network.

According to an example embodiment, the communication network acting as the access network comprises the same network as the other communication network.

According to an aspect, a plurality of interworking functions, which provide interworking between a communication network acting as access network and another communication network, is associated with a plurality of network slices or non-public networks hosted by the other communication network. A user equipment performs connection to a communication network acting as access network, and selects an interworking function of the plurality of interworking functions based on information on a network slice or non-public network hosted by the other communication network, wherein the user equipment is associated with the network slice or non-public network.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
 associating a plurality of interworking functions, which provide interworking between a communication network acting as an access network and another communication network, with a plurality of network slices or non-public networks hosted by the other communication network; and
 configuring a user equipment to select an interworking function of the plurality of interworking functions based on information on a network slice or non-public network the user equipment is associated with, of the plurality of network slices or non-public networks;
 wherein the non-public network comprises at least one of a network slice of the communication network and a closed access group;
 wherein the information on the non-public network comprises at least one of an identity of the network slice the user equipment is accessing and an identifier of the closed access group broadcast by closed access group cells that the user equipment is allowed to access; and/or
 the identity of the network slice is based on a type and/or service of the network slice; and/or
 the identity of the network slice is based on the type and/or service of the network slice and a differentiator of the network slice; and
 wherein the identifier of the closed access group is a last used identifier that was stored by the user equipment.

2. The method of claim 1, wherein
 the interworking function comprises a non-third generation partnership project interworking function; and/or
 the access network comprises at least one of a non-third generation partnership project access network and a third generation partnership project access network; and/or
 the other communication network comprises a public land mobile network, PLMN; and/or
 the communication network acting as the access network comprises a PLMN; and/or
 the communication network acting as the access network comprises a Non-Public Network; and/or
 the communication network acting as the access network comprises the same network as the other communication network.

3. A method for use by a user equipment, the method comprising:
 performing connection to a communication network acting as an access network; and
 selecting an interworking function which provides interworking between the communication network acting as the access network and another communication network, based on information on a network slice or non-public network hosted by the other communication network, wherein the user equipment is associated with the network slice or non-public network;
 wherein the non-public network comprises at least one of a network slice of the communication network and a closed access group;
 wherein the information on the non-public network comprises at least one of an identity of the network slice the user equipment is accessing and an identifier of the closed access group broadcast by closed access group cells that the user equipment is allowed to access; and/or
 the identity of the network slice is based on a type and/or service of the network slice; and/or
 the identity of the network slice is based on the type and/or service of the network slice and a differentiator of the network slice; and
 wherein the identifier of the closed access group is a last used identifier that was stored by the user equipment.

4. The method of claim 3, further comprising:
 for selecting the interworking function, including the information on the network slice or non-public network into a query for an internet protocol address of the interworking function.

5. An apparatus comprising at least one processor and at least one memory including computer program code, the at least one memory and the computer program code configured to, with the at least one processor, cause the apparatus at least to perform:

associating a plurality of interworking functions, which provide interworking between a communication network acting as an access network and another communication network, with a plurality of network slices or non-public networks hosted by the other communication network; and configuring a user equipment to select an interworking function of the plurality of interworking functions based on information on a network slice or non-public network the user equipment is associated with, of the plurality of network slices or non-public networks;

wherein the non-public network comprises at least one of a network slice of the communication network and a closed access group;

wherein the information on the non-public network comprises at least one of an identity of the network slice the user equipment is accessing and an identifier of the closed access group broadcast by closed access group cells that the user equipment is allowed to access; and/or the identity of the network slice is based on a type and/or service of the network slice; and/or the identity of the network slice is based on the type and/or service of the network slice and a differentiator of the network slice; and wherein the identifier of the closed access group is a last used identifier that was stored by the user equipment.

6. The apparatus of claim 5, wherein the interworking function comprises a non-third generation partnership project interworking function; and/or the access network comprises at least one of a non-third generation partnership project access network and a third generation partnership project access network; and/or the other communication network comprises a public land mobile network, PLMN; and/or the communication network acting as the access network comprises a PLMN; and/or the communication network acting as the access network comprises a Non-Public Network; and/or the communication network acting as the access network comprises the same network as the other communication network.

7. An apparatus for use by a user equipment, the apparatus comprising at least one processor and at least one memory including computer program code, the at least one memory and the computer program code configured to, with the at least one processor, cause the apparatus at least to perform:

performing connection to a communication network acting as an access network; and selecting an interworking function which provides interworking between the communication network acting as the access network and another communication network, based on information on a network slice or non-public network hosted by the other communication network, wherein the user equipment is associated with the network slice or non-public network;

wherein the non-public network comprises at least one of a network slice of the communication network and a closed access group;

wherein the information on the non-public network comprises at least one of an identity of the network slice the user equipment is accessing and an identifier of the closed access group broadcast by closed access group cells that the user equipment is allowed to access; and/or the identity of the network slice is based on a type and/or service of the network slice; and/or the identity of the network slice is based on the type and/or service of the network slice and a differentiator of the network slice; and wherein the identifier of the closed access group is a last used identifier that was stored by the user equipment.

8. The apparatus of claim 7, wherein the at least one memory and the computer program code are configured to, with the at least one processor, cause the apparatus to further perform:

for selecting the interworking function, including the information on the network slice or non-public network into a query for an internet protocol address of the interworking function.

\* \* \* \* \*